United States Patent
Field et al.

(10) Patent No.: US 11,395,016 B2
(45) Date of Patent: *Jul. 19, 2022

(54) CACHE EVICTION DURING OFF-PEAK TRANSACTIONS

(71) Applicant: TIVO CORPORATION, San Jose, CA (US)

(72) Inventors: Brian Field, Evergreen, CO (US); Jan Van Doorn, Castle Rock, CO (US)

(73) Assignee: TIVO CORPORATION, San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/137,319

(22) Filed: Dec. 29, 2020

(65) Prior Publication Data

US 2021/0120284 A1    Apr. 22, 2021

Related U.S. Application Data

(63) Continuation of application No. 16/855,415, filed on Apr. 22, 2020, now Pat. No. 11,070,850, which is a continuation of application No. 13/304,761, filed on Nov. 28, 2011, now Pat. No. 10,681,394.

(51) Int. Cl.
| | |
|---|---|
| *H04L 67/5682* | (2022.01) |
| *H04N 21/231* | (2011.01) |
| *H04N 21/222* | (2011.01) |
| *H04L 67/289* | (2022.01) |
| *H04L 67/568* | (2022.01) |
| *H04N 21/2183* | (2011.01) |

(52) U.S. Cl.
CPC ..... *H04N 21/23113* (2013.01); *H04L 67/289* (2013.01); *H04L 67/2842* (2013.01); *H04L 67/2852* (2013.01); *H04N 21/2183* (2013.01); *H04N 21/2221* (2013.01); *H04N 21/231* (2013.01); *H04N 21/23106* (2013.01)

(58) Field of Classification Search
CPC ......... H04N 21/23113; H04N 21/2183; H04N 21/2221; H04N 21/231; H04N 21/23106; H04L 67/2842; H04L 67/2852; H04L 67/289
See application file for complete search history.

(56) References Cited

U.S. PATENT DOCUMENTS

| | | |
|---|---|---|
| 5,614,940 A | 3/1997 | Cobbley et al. |
| 6,085,193 A | 7/2000 | Malkin et al. |
| 7,275,103 B1 | 9/2007 | Thrasher et al. |
| 8,335,775 B1 | 12/2012 | Sedlar et al. |
| 8,996,807 B2 * | 3/2015 | Joshi ............ G06F 9/45558 711/100 |

(Continued)

*Primary Examiner* — Michael A Keller
(74) *Attorney, Agent, or Firm* — Haley & Guiliano LLP

(57) ABSTRACT

Transaction activity of a cache maintaining content may be monitored to determine periods of transaction activity below a first threshold amount of transactions. A period of anticipated transaction activity above a second threshold amount of transactions may be determined. A period of anticipated transaction activity below the first threshold may be selected based upon the monitored periods of transaction activity below the first threshold and the determined period of anticipated transaction activity above the second threshold. Content then may be evicted from the cache during the selected period of anticipated transaction activity.

20 Claims, 6 Drawing Sheets

(56) References Cited

U.S. PATENT DOCUMENTS

| | | |
|---|---|---|
| 2002/0054567 A1 | 5/2002 | Fan |
| 2003/0187931 A1 | 10/2003 | Olsen et al. |
| 2003/0195940 A1 | 10/2003 | Basu et al. |
| 2004/0162890 A1 | 8/2004 | Ohta |
| 2005/0147386 A1 | 7/2005 | Jung et al. |
| 2006/0204214 A1 | 9/2006 | Shah et al. |
| 2007/0130097 A1* | 6/2007 | Andreev ............. G06F 11/3447 706/46 |
| 2009/0165071 A1 | 6/2009 | Lejeune |
| 2009/0248787 A1 | 10/2009 | Sivasubramanian et al. |
| 2010/0274962 A1 | 10/2010 | Mosek et al. |
| 2010/0306484 A1 | 12/2010 | Obr et al. |
| 2012/0159558 A1 | 6/2012 | Whyte et al. |
| 2012/0307078 A1 | 12/2012 | Canan et al. |
| 2017/0064351 A1 | 3/2017 | Jakkula et al. |
| 2018/0309798 A1 | 10/2018 | Mathews et al. |

\* cited by examiner

CACHE EVICTION DURING OFF-PEAK TRANSACTIONS

CROSS-REFERENCE TO RELATED APPLICATIONS

This application is a continuation of U.S. patent application Ser. No. 16/855,415, filed on Mar. 22, 2020, which is a continuation of U.S. patent application Ser. No. 13/304,761 (now U.S. Pat. No. 10,681,394), filed Nov. 28, 2011. The disclosures of each application are hereby incorporated by reference herein in their entireties.

BACKGROUND

A content delivery network (CDN) may comprise a network of caching infrastructure servers that delivers a piece of requested content (e.g., television content, a Web page, audio, video, data, etc.) to a user based on the proximate or geographic location of the user, the origin of the requested media and a content delivery server. A CDN typically copies the media content to a network of servers that are dispersed at geographically different locations, caching the media content at each location. When a user requests as part of a transaction a particular piece of media content that is part of a CDN, the CDN will redirect the request from the originating site's server to a server in the CDN that is closest to the user and deliver the cached content.

The CDN may also communicate with the originating server to deliver any content that has not been previously cached. The closer the CDN server is to the user geographically, the faster the content is typically delivered to the user. CDNs also provide protection from large surges in traffic. The process of bouncing through a CDN is typically transparent to the user.

On some CDN servers, when the disk cache reaches a certain threshold, e.g., 95%, of the total cache space, a process runs to evict, e.g., remove or delete, old content from the cache. This process consumes central processing unit (CPU) and more importantly input/output (I/O) capacity on the server. Further, this process can occur at any time. The probability is high that this process will in fact occur during times of high transaction activity; when the server can least afford the drain on its resources. Evicting older content maintained in the cache when a pre-determined percentage of the total cache capacity is reached drains these and other valuable resources. Because the cache will frequently reach the capacity threshold when there is a lot of use and/or transaction activity, such an evict as needed approach results in additional maintenance load during high-peak times, which can translate into poorer quality video delivered to customers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to reducing cache eviction overhead during high transaction periods. Transaction activity, which may correlate to users wanting to view video content, of a cache maintaining video content may be monitored to determine periods of transaction activity below a first threshold amount of transactions. A period of anticipated transaction activity above a second threshold amount of transactions may be determined. A period of anticipated transaction activity below the first threshold may be selected based upon the monitored periods of transaction activity below the first threshold and the determined period of anticipated transaction activity above the second threshold. Video content may be evicted from the cache during the selected period of anticipated transaction activity below the first threshold until content in the cache is below a third threshold of the total cache space. This evicting occurs prior to the period of anticipated transaction activity above the second threshold.

In accordance with other aspects of the present disclosure, transaction activity of a first cache maintaining content may be monitored to determine a period of transaction activity above a first threshold amount of transactions for a first content by a first group of accessing users. The first cache may be configured to allow transactions by the first group of accessing users because the first group of users is geographically closest to the first cache. A second cache maintaining content and being configured to allow transactions by a different group of accessing users may be determined. The different group of users may be geographically closest to the second cache. The second cache may be prepopulated with the first content based upon the monitored transaction activity of the first cache maintaining content.

By using knowledge of bandwidth consumption habits, likely unused video content may be pre-evicted from caches in order to free up space in the cache and thus reduce cache eviction overhead during peak viewing times. Cache activity may be monitored to determine periods of fewer transactions. The day of week may be taken into account for the monitoring. A period of low, off-peak, activity as close as possible to, but before, the period of most, peak, activity may be selected. Cached video content may be evicted until the cache occupies less than some percentage of the total local storage capacity. The percentage may be 20%. Eviction may be based on evicting the oldest content, evicting one version of multiple versions of the same content, and/or evicting based on other manners.

A process or script may be developed which runs during mid/late afternoon hours and evicts content such that 80% of the cache space is made available prior to going into prime-time. During high-viewing times, it may be desirable to have the cache engine have its capacity focused on delivering content to users and not performing cache clean-up. Given the time of day effects to viewing content and peaks during prime-time, content in the cache the aired between 2-4 pm, local time, might rarely be used at prime time, e.g., 8 pm. As such, it may be desirable to evict a significant amount of cache content during the mid to late afternoon hours, when load on the CDN is low, and eliminate the overhead expense of evicting content during peak hours, which could impact the number of users supported per cache or the video quality level observed by users due to automatic bit rate behavior.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
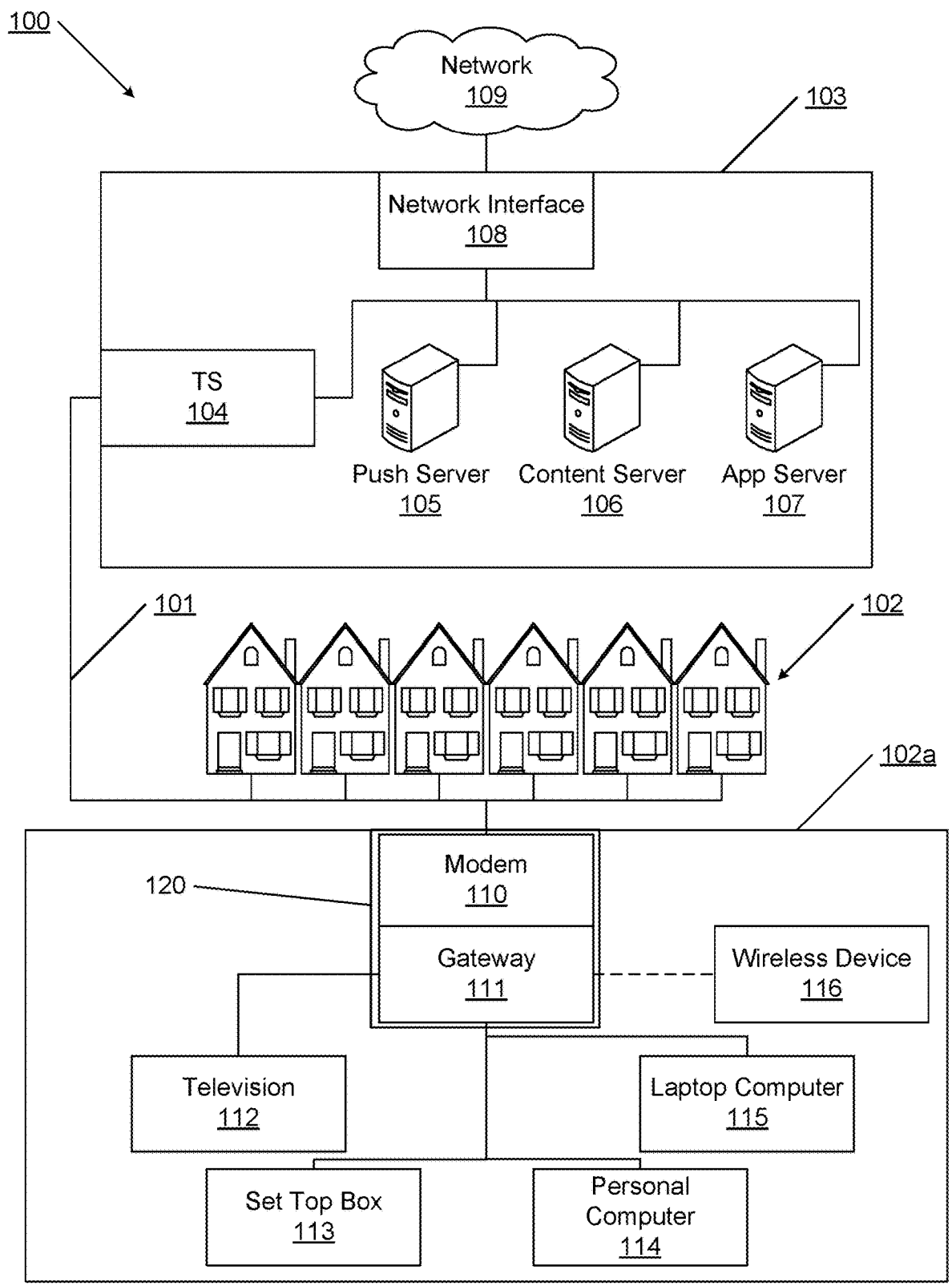
FIG. 1 illustrates an example content distribution network according to one or more aspects described herein.

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS 104 may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for enabling chat sessions.

An example premises 102a, such as a home, may include an interface 120. The interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
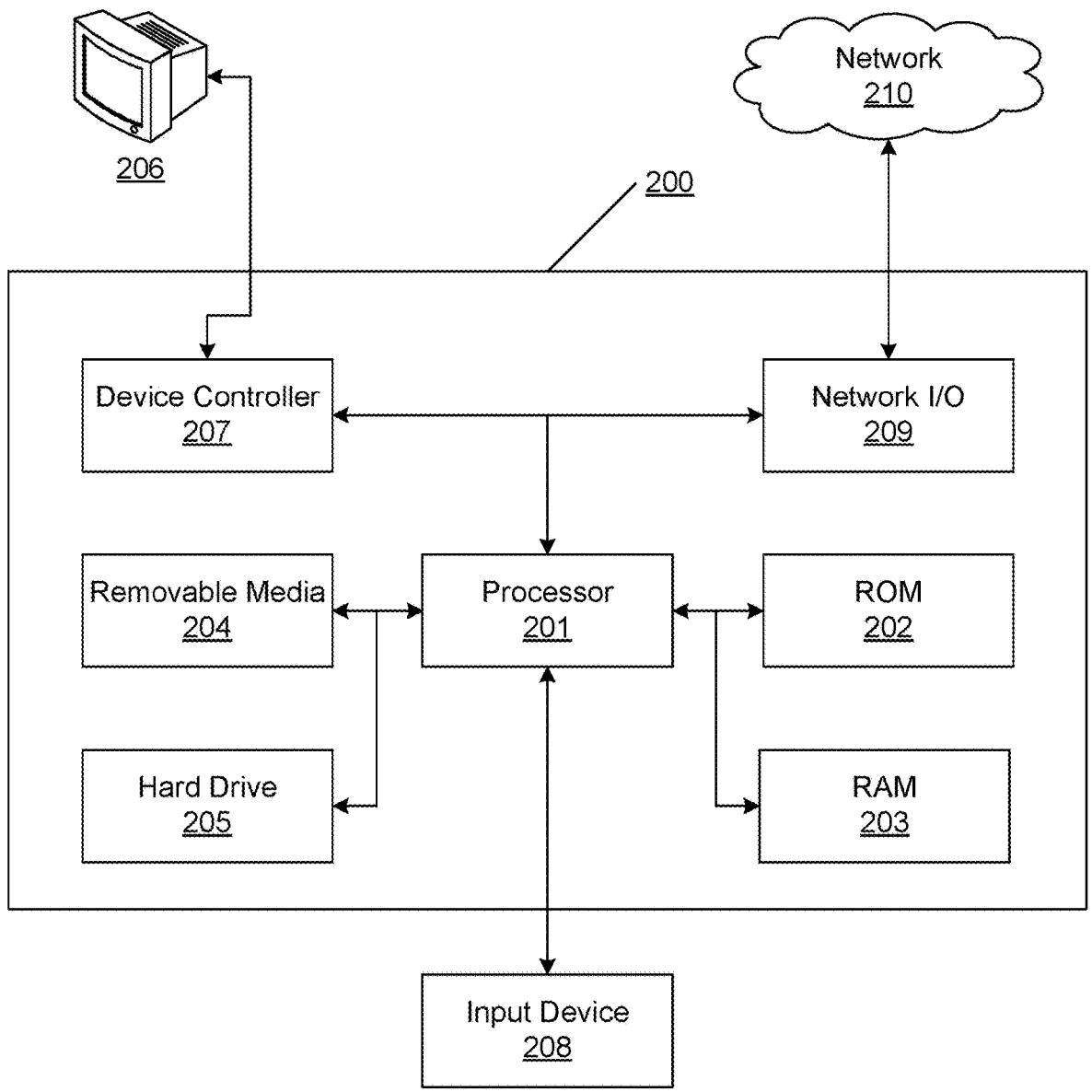
FIG. 2 illustrates an example hardware platform on which the various elements described herein may be implemented according to one or more aspects described herein.

FIG. 2 illustrates general hardware and software elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
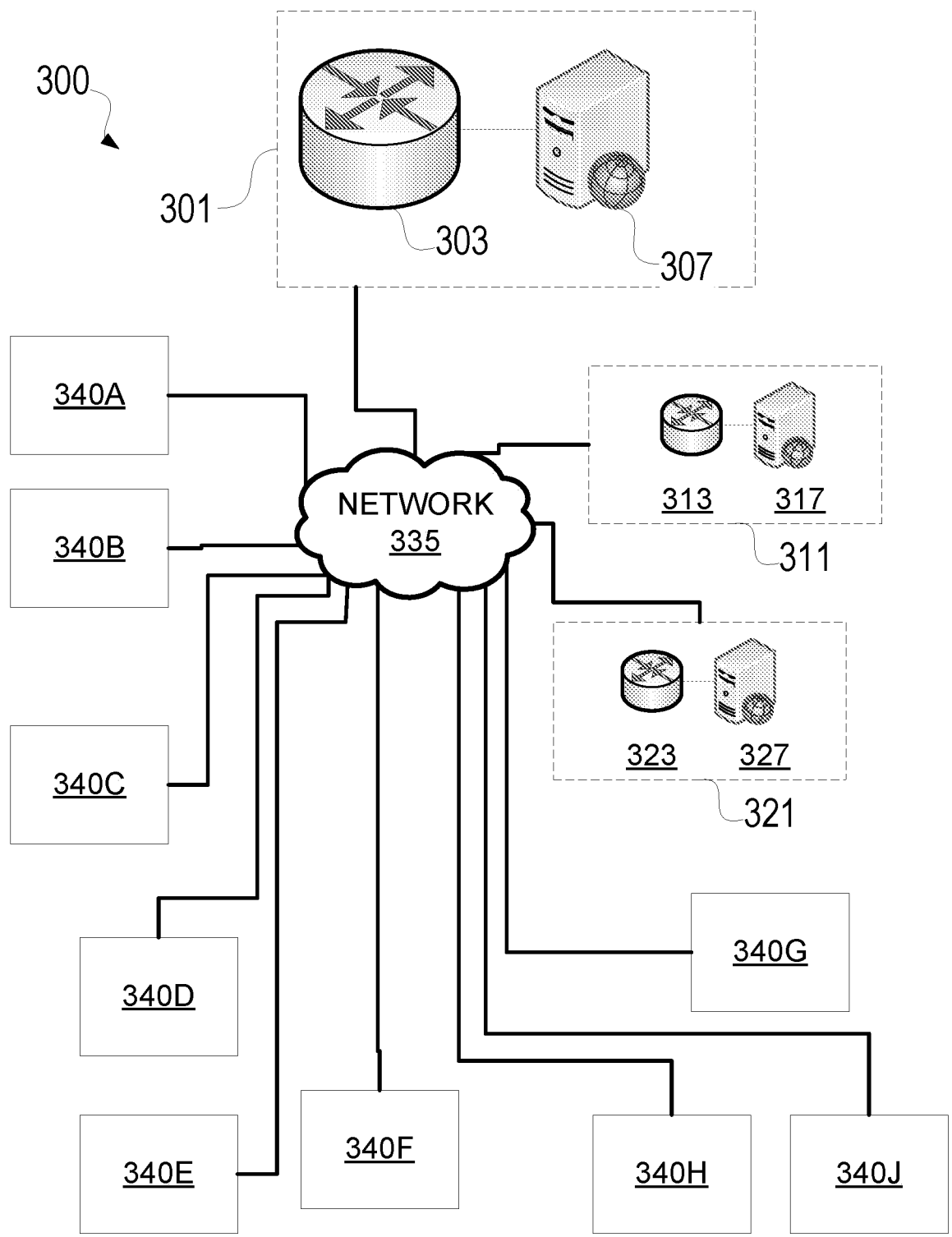
FIG. 3 illustrates a high level system architecture according to one or more illustrative aspects described herein.

With reference to FIG. 3, various features described herein provide a system architecture 300 to enable content eviction. System 300 may include a plurality of content delivery networks (CDN) CDN-A 301, CDN-B 311, and CDN-C 321 interconnected by one or more networks 335. Each CDN 301, 311, 321 may include a router 303, 313, 323, and a cache, such as a server, 307, 317, 327, respectively. A plurality of users may connect to the network, and in turn request content from one or more of the CDNs 301, 311, 321. Users 340A, 340B, and 340C may be geographically close to CDN-A 301 and therefore may access it for requesting content. Similarly, users 340D, 340E, and 340F and users 340G, 340H, and 340J may be geographically close to CDN-B 311 and CDN-C 321, respectively, and therefore may access their respective CDN for requesting content.

Using the system architecture 300, a model for cache content eviction is provided. The eviction model described herein, among other benefits, reduces the overhead expense of evicting content during peak hours, which for example could impact the number of users supported per cache or the video quality level observed by users due to automatic bit rate behavior. According to an illustrative aspect, transaction activity representative of requests by users 340A, 340B, and 340C may be monitored throughout one or more time periods, such as hourly, daily, weekly, etc. Based upon anticipated periods of time in which transaction requests for content from CDN-A 301 are likely to occur, content from CDN-A 301 may be evicted from first cache 307 in order to free up space within the cache 307 in anticipation of the high demand for content via transaction requests. The eviction of the cache content may be made during a time period of low transaction activity as close as possible to the determined time period of anticipated high transaction activity. A transaction is an access of a cache with content for the content. Examples transactions would include accessing a video on demand server for video content, and accessing a server maintaining live transmitted content.

Figure 4:
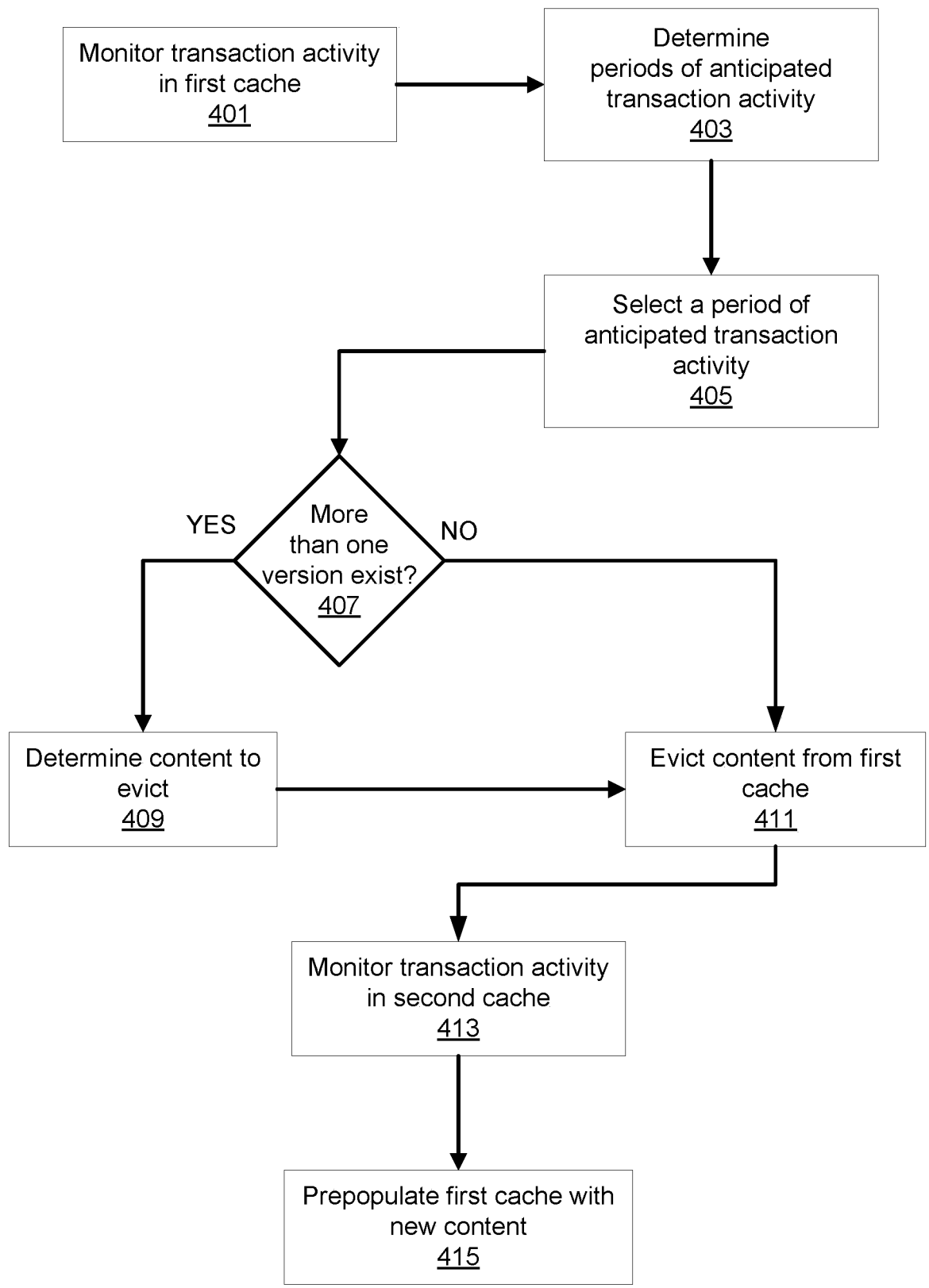
FIG. 4 illustrates a flow chart for a method of cache eviction according to one or more illustrative aspects described herein.
Figure 6:
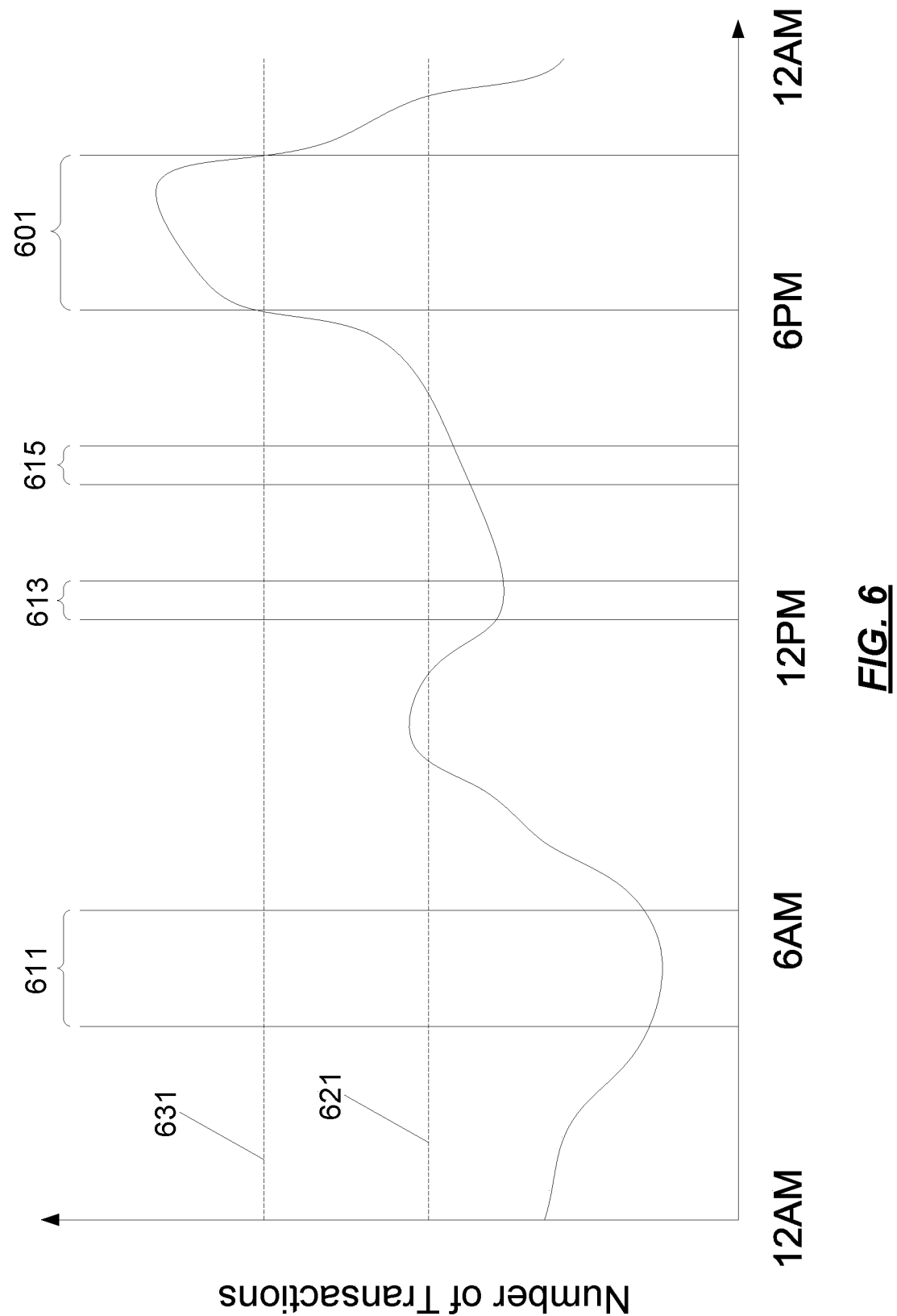
FIG. 6 illustrates a graphic of transaction activity of a monitored cache according to one or more illustrative aspects described herein.

With reference to FIG. 4, an illustrative method for performing cache eviction is now described. Initially, in step 401, transaction activity in a first cache, e.g., cache 307, may be monitored. The monitoring may be implemented by a component of the CDN, such as the first cache, and/or by a separate external device having access to the first cache. The monitoring period of the first cache may be over a period of minutes, hours, a day, a week, and/or other time period. FIG. 6 illustrates a graphic of transaction activity of a monitored cache according to one or more illustrative aspects described herein. In the example of FIG. 6, the cache is monitored over a time span of 24 hours. In monitoring the number of transactions, the system may determine one or more periods of transaction activity that fall below some first threshold amount of transactions.

Periods 611, 613, and 615 are three such periods shown in FIG. 6. Fewer or more than three periods may be determined. In addition, the time spam for one period, such as 611, may be a different time span than for another period, such as 615. Each of periods 611, 613, and 615 falls below a first threshold 621. Threshold 621 may be a particular number of transactions that defines off-peak viewing periods of users. Any time period below first threshold 621 may be deemed a time period of low viewing activity. Threshold 631 may be a particular number of transactions that defines peak viewing periods of users. Any time period above second threshold 631 may be deemed a time period of high viewing activity. For example, as shown in the FIG. 6 example, between midnight and 7 am, the number of transactions for users accessing a CDN cache is low in comparison to between 6 pm and 10 pm. In the example of FIG. 6, period 601 includes transaction activity above second threshold 631. As such, period 601 may correspond to a period of high viewing activity by users.

A data structure may be utilized to maintain the configuration parameters for the periods described with respect to FIG. 6. For example, a table may be implemented that specifies what "high" and "low" transaction rates mean and/or or set at. For each rate, such a table may specify what the eviction procedure is, e.g., "high" is more than 100 streaming requests per second, and in that mode only evict if cache content is >90%. In another example, "low" may be less than 20 streaming request per second, and in that mode eviction only occurs if cache content is >98%.

Returning to FIG. 4, in step 403, periods of anticipated transaction activity above a certain second threshold 631 may be determined. The determined periods of anticipated transaction activity may be implemented by a component of the CDN, such as the first cache, and/or by a separate external device having access to the first cache. Having monitored enough time spans, periods of high transaction activity and periods of low transaction activity may be anticipated for future time spans. For example, a popular hour long television show may have a large viewership with a large number of users viewing the television show. New episodes of the television show may air every Wednesday night from 9 pm-10 pm Eastern time zone. As such, the hour long period between 9 pm-10 pm on Wednesday nights may be determined to be an anticipated period where transaction activity will be above a threshold amount of transactions since demand for the content is anticipated as being high.

In step 405, a period of anticipated transaction activity below a certain first threshold 621 may be selected. The selecting may be implemented by a component of the CDN, such as the first cache, and/or by a separate external device having access to the first cache. For example, with respect to FIG. 6, one or more of similar periods 611, 613, and/or 615 may be selected. Each or periods 611, 613, and 615 have transaction activity that falls below first threshold 621. Based upon monitoring of the transaction activity of a first cache 307, the CDN-A 301 may determine that the same periods on the next day or next similar day of the week likely will have similar anticipated transaction activity, e.g., that if period 611 correlates to 4 am-6 am each morning, than the period of 4 am-6 am tomorrow morning likely will have the same anticipated transaction activity. In selecting a period of anticipated transaction activity below the certain first threshold 621 in step 405, the CDN-A 301 further may base the selecting on one or more of the determined periods of anticipated transaction activity above the second threshold 631 from step 403.

One reason the CDN-A 301 may base the selecting of step 405 on the one or more determined periods of anticipated transaction activity above the second threshold 631 from step 403 is that the CDN-A 301 may want to retain as much different content for as long as possible before having to evict content in anticipation of high transaction activity. As such, based upon the monitoring of step 401, the CDN-A 301 may determine that of the determined periods in step 403, such as periods 611, 613, and 615 in the FIG. 6 example, period 615 is closest in time to the period 601 in which transaction activity will be high. As such, the CDN-A 301 may select period 615 in step 405 since period 615 is closest in time to the anticipated period 601 determined in step 403.

Proceeding to step 407, a determination may be made as to whether more than one version of a particular content exists in the cache 307. The determination may be implemented by a component of the CDN, such as the first cache, and/or by a separate external device having access to the first cache. For example, cache 307 may maintain a first content in a standard definition (SD) version as well as a high definition (HD) version. A user, such as user 340A, may have the option to request a transaction for either of the HD or the SD version of the first content or another version now existing or developed in the future. User 304A may have a home system that is configured to display HD content, while user 340B may have a system that is not configured to display HD content and therefore would have to request SD content. In another example, a plurality of versions of a first content may be maintained in first cache 307 that correlate to a same content for different times. In such an example, the first content may be the local news television program and the first cache 307 may maintain the last three versions of the local news, the 6 am hour long local news, the 7 am hour long local news, and the 11 am hour long local news. In such an example, if the current time is 1 pm, the 11 am hour long local news content is the most recent version of the three contents.

In other examples, cache 307 may maintain a first content in a high bit rate transmission format as well as a low bit rate transmission format. A user, such as user 340A, may have the option to request a transaction for either of the high bit rate transmission format or the low bit rate transmission format of the first content or another version now existing or developed in the future. In still other examples, cache 307 may maintain a first content in a small file size version as well as a large file size version. A user, such as user 340A, may have the option to request a transaction for either of the small file size or the large file size version of the first content or another version now existing or developed in the future.

If not more than one version of the content exists in step 407, the process moves to step 411 as described below. If more than one version does exist in step 407, the process moves to step 409 where a determination is made as to which version of the multiple versions of content to evict. The determination may be implemented by a component of the CDN, such as the first cache, and/or by a separate external device having access to the first cache. In the above example of HD and SD content, the CDN-A 301 may determine that the SD version of the content should be evicted. The CDN-A 301 may determine that eviction of the SD version of the content is preferred since retrieval of the SD version of the content at a later time would utilize fewer resources than having to retrieve the HD version of the content. When a CDN-A 301 has to retrieve content for a user because it does not currently maintain a copy of the content, retrieval of a SD version of the content utilizes fewer computing resources. As such, in determining whether to evict a HD version or a SD version of content, a CDN-A 301 may determine that evicting the SD version of the content is preferred since retrieval, if needed in the future, of the SD version is less resource intensive.

In another example, the content may include three versions of content with a first version as a SD video version, a second version as a HD video version, and a third version as an associated audio version that may be utilized with either the SD video version or the HD video version. In such an example, in determining which version to evict in step 409, the CDN-A 301 may determine to not evict the associated audio version of the content and/or to not evict the associated audio version of the content until all corresponding video versions of the content have been evicted. Maintaining a common associated audio version of the content ensures that at least one full video version, such as the HD video version, and associated audio version for the content is maintained in the cache 307.

Figures 5A, 5B:
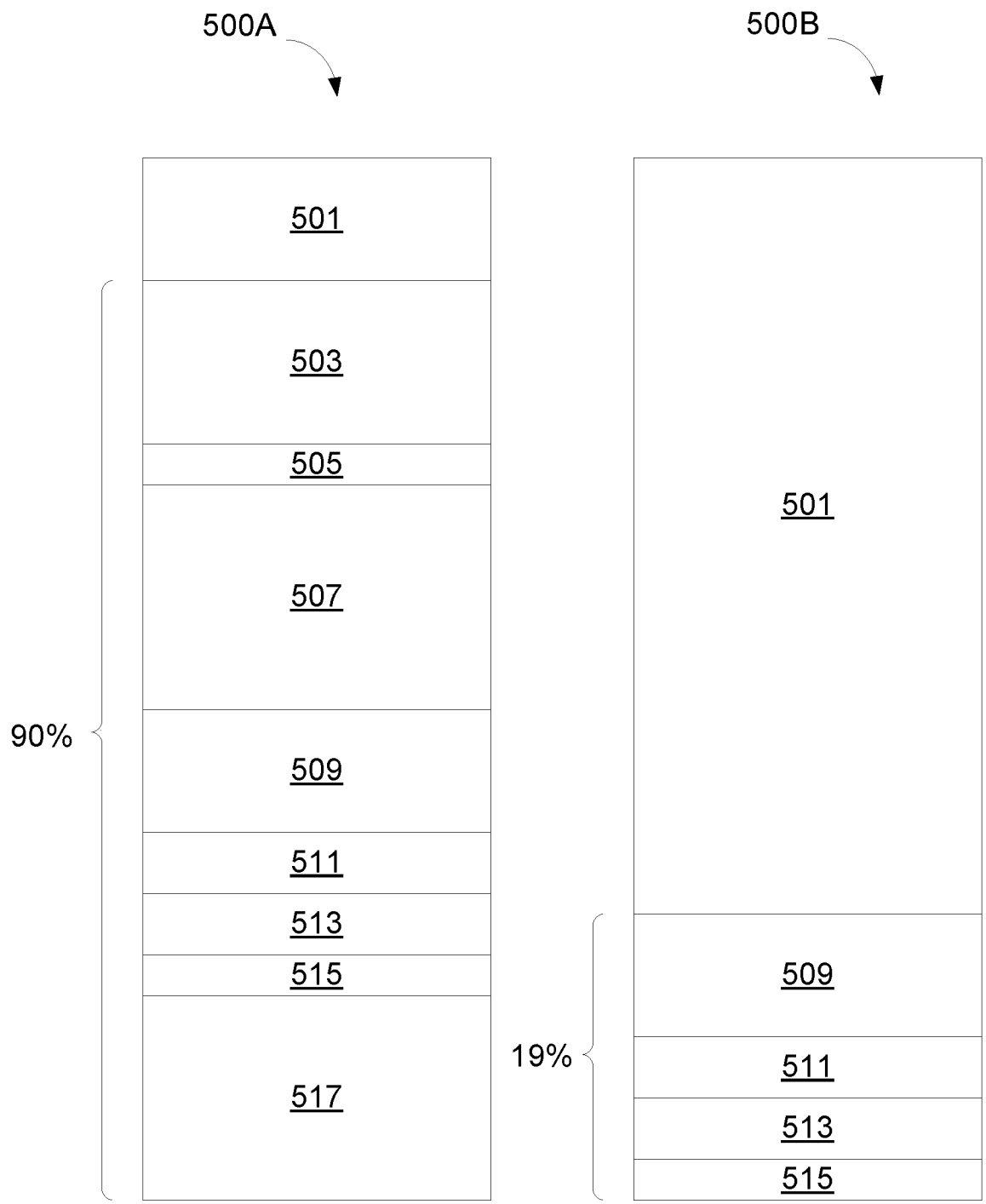
FIGS. 5A-5B illustrate two stages showing the amount of content of a cache according to one or more illustrative aspects described herein.

In step 411, content from the first cache 307 may be evicted and deleted from the cache. The eviction and deletion may be implemented by a component of the CDN, such as the first cache, and/or by a separate external device having access to the first cache. If proceeding from step 409, the content that is evicted may be the determined content, such as the SD version of a content. The evicting of the content the first cache 307 may occur during the selected period of anticipated transaction activity below the first threshold 621 that was selected in step 405 and may occur before the determined period of anticipated transaction activity above the second threshold 631 that was determined in step 403. Eviction of content from cache 307 may continue until content within the total cache space is below some third threshold. FIGS. 5A-5B illustrate two stages showing the amount of content of a cache, such as cache 307, according to one or more illustrative aspects described herein. Prior to eviction of content shown by cache content 500A in FIG. 5A, eight different content (503, 505, 507, 509, 511, 513, 515, and 517) are maintained. Free content space 501 may be unused cache space. In the example of FIG. 5A, the total cache content 500A is 90% full of content.

Following the eviction of content in step 411, cache content 500B in FIG. 5B illustrates an example result. Content 503, 505, 507, and 517 have been evicted while content 509, 511, 513, and 515 have been maintained. As shown in the example of FIG. 5B, following the eviction of the content, the total amount of cache content space being utilized to maintain content 509, 511, 513, and 515, is 19%. The amount of 19% being below a certain third threshold of total cache space may ensure that enough space 501 is available for loading of new content in anticipation of the peak viewing of users during the determined period of transaction activity above the second threshold 631.

Returning to FIG. 4, at step 413 transaction activity in a second cache, e.g., cache 327, may be monitored. The monitoring of the second cache 327 in step 413 may be similar to the monitoring of the first cache 307 described above with respect to step 401. The monitoring period of the second cache may be over a period of minutes, hours, a day, a week, and/or other time period. The monitoring may include monitoring the transaction activity for a new content that is above some threshold amount of transactions. For example, CDN-B 311 may monitor the transaction activity to determine that transaction requests for the new content were high during the period of 8 pm-10 pm. In this example, CDN-B 311 may be geographically located within the Eastern time zone and therefore has new content accessible to its users prior to CDN-A 301 which may be geographically located within the Western time zone and therefore the same new content may not be accessible to its users until 11 pm Eastern time zone (8 pm Western time zone).

In step 415, the CDN-A 301 may prepopulate its cache 307 with the new content until the total cache space is filled with content above a specified threshold. The prepopulating may be implemented by a component of the CDN, such as the first cache, and/or by a separate external device having access to the first cache. As such, because the CDN-A 301 is located in the Western time zone in this example, it can be ready for the anticipated high demand for access to the new content when made available at 8 pm Western time zone. By utilizing the viewing habits of users in the Eastern time zone, adjustments can be made to caches located in other time zones.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. For example, each of the elements of the aforementioned embodiments may be utilized alone or in combination or subcombination with elements of the other embodiments. The description is thus to be regarded as illustrative instead of restrictive on the present disclosure. Additional embodiments may not perform all operations, have all features, or possess all advantages described above. For example, methods of the present disclosure may add and/or omit steps as described in the illustrative embodiments herein and/or may change the order of the steps presented herein. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and non-transitory machine-readable storage media. Any and all permutations of features from above-described embodiments are the within the scope of the disclosure.

The invention claimed is:

1. A method comprising:
monitoring, by a computing device, request activity for content stored in a content cache;
identifying, by the computing device based on the monitoring, a high request activity time period and a low request activity time period for the monitored request activity, the high request activity time period corresponding to a high request activity level and the low request activity time period corresponding to a low request activity level;
selecting, by the computing device, a future time period during which a request activity level is anticipated to be at least as high as the high request activity level;
allocating, by the computing device for the selected future time period, an amount of cache space at least as great as an amount of cache space used during the selected high request activity time period; and
causing, by the computing device, the content to be cached in the allocated amount of cache space during the future time period.

2. The method of claim 1, further comprising, adjusting the allocated amount of cache space for the future time period based on past request activity data.

3. The method of claim 2, wherein, the past request activity data relates to request activity data from a geographically located time zone that precedes the time zone of the future time period.

4. The method of claim 1, wherein, allocating the at least as great as an amount of cache space comprises evicting older content stored in the content cache during the selected low request activity time period.

5. The method of claim 4, wherein the evicting of the older content stored in the content cache is performed at a predetermined time prior to a start of the high request activity time period.

6. The method of claim 1, wherein, allocating the at least as great as an amount of cache space comprises evicting multiple versions of the same content stored in the content cache.

7. The method of claim 6, wherein, the multiple versions include the same content correlated for different geographical time zones.

8. The method of claim 6, wherein, the multiple versions include the same content in standard definition (SD) and in high definition (HD).

9. The method of claim 1, wherein, the content stored in the content cache is a plurality of episodes of a same series.

10. The method of claim 9, wherein, the monitoring the request activity for content stored in a content cache includes monitoring the plurality of episodes of the same series to determine whether the episodes have a high request activity or a low request activity.

11. The method of claim 9, wherein, the high request activity time period is a time period for which the amount of request activity for content stored in a content cache is above a threshold amount.

12. The method of claim 9, wherein, the low request activity time period is a time period for which the amount of request activity for content stored in a content cache is below a threshold amount.

13. An apparatus comprising:
one or more processors; and
memory storing computer-executable instructions that, when executed by the one or more processors, cause the apparatus to:
monitor, by a computing device, request activity for content stored in a content cache;
identify, by the computing device based on the monitoring, a high request activity time period and a low request activity time period for the monitored request activity, the high request activity time period corresponding to a high request activity level and the low request activity time period corresponding to a low request activity level;

select, by the computing device, a future time period during which a request activity level is anticipated to be at least as high as the high request activity level;

allocate, by the computing device for the selected future time period, an amount of cache space at least as great as an amount of cache space used during the selected high request activity time period; and cause, by the computing device, the content to be cached in the allocated amount of cache space during the future time period.

14. The apparatus of claim 13, further comprising, adjusting the allocated amount of cache space for the future time period based on past request activity data.

15. The apparatus of claim 14, wherein, the past request activity data relates to request activity data from a geographically located time zone that precedes the time zone of the future time period.

16. The apparatus of claim 13, wherein, allocating the at least as great as an amount of cache space comprises evicting older content stored in the content cache during the selected low request activity time period.

17. The apparatus of claim 16, wherein the evicting of the older content stored in the content cache is performed at a predetermined time prior to a start of the high request activity time period.

18. The apparatus of claim 13, wherein, allocating the at least as great as an amount of cache space comprises evicting multiple versions of the same content stored in the content cache.

19. The apparatus of claim 13, wherein, the content stored in the content cache is a plurality of episodes of a same series.

20. The apparatus of claim 19, wherein, the monitoring the request activity for content stored in a content cache includes monitoring the plurality of episodes of the same series to determine whether the episodes have a high request activity or a low request activity, wherein the high request activity is a request that is above a threshold amount and the low request activity is a request that is below the threshold amount.

* * * * *